United States Patent
Dinkel et al.

(10) Patent No.: US 11,542,984 B2
(45) Date of Patent: Jan. 3, 2023

(54) SNAP RING AND BEARING ASSEMBLY INCLUDING A SNAP RING

(71) Applicant: AKTIEBOLAGET SKF, Gothenburg (SE)

(72) Inventors: Sebastian Dinkel, Grettstadt (DE); Wolfgang Runge, Grettstadt (DE); Johannes Ruopp, Oerlenbach (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 17/202,467

(22) Filed: Mar. 16, 2021

(65) Prior Publication Data

US 2021/0301876 A1 Sep. 30, 2021

(30) Foreign Application Priority Data

Mar. 26, 2020 (DE) .......................... 102020203957.7

(51) Int. Cl.
*F16C 33/58* (2006.01)
*F16C 19/26* (2006.01)
*F16B 21/18* (2006.01)

(52) U.S. Cl.
CPC ............ *F16C 33/585* (2013.01); *F16B 21/18* (2013.01); *F16C 19/26* (2013.01); *F16C 2226/74* (2013.01)

(58) Field of Classification Search
CPC ...... F16B 21/18; F16B 21/183; F16B 21/186; F16C 33/585; F16C 2226/74
See application file for complete search history.

(56) References Cited

U.S. PATENT DOCUMENTS

| | | | | |
|---|---|---|---|---|
| 3,460,427 | A * | 8/1969 | Baumgarten | F16B 21/18 403/375 |
| 4,405,274 | A * | 9/1983 | Saitoh | F16B 39/14 411/249 |
| 4,558,962 | A * | 12/1985 | Meinlschmidt | F16B 21/18 384/570 |
| 8,337,111 | B2 * | 12/2012 | Pajewski | F16H 57/0031 403/DIG. 7 |
| 2020/0217369 | A1 * | 7/2020 | Hiura | F16C 35/073 |
| 2020/0263721 | A1 * | 8/2020 | Groves | F16K 27/00 |

FOREIGN PATENT DOCUMENTS

| | | | |
|---|---|---|---|
| DE | 102005042346 | * | 3/2007 |
| DE | 102011088716 A1 | | 6/2013 |
| DE | 102006039365 B4 | | 9/2018 |
| WO | WO 2017082359 | * | 5/2017 |

* cited by examiner

*Primary Examiner* — James Pilkington
(74) *Attorney, Agent, or Firm* — J-Tek Law PLLC; Scott T. Wakeman; Mark A. Ussai

(57) ABSTRACT

A snap ring for guiding rolling elements between an inner ring and an outer ring of a bearing assembly includes an annular body having an axially facing side surface and a radially extending flange. The body is circular and has a circumferential gap between a first end of the body and a second end of the body and a recess in the side surface near the gap. The recess is configured such that a tool is introducible into the recess from outside the bearing assembly in order to remove the snap ring from the bearing assembly.

18 Claims, 2 Drawing Sheets

SNAP RING AND BEARING ASSEMBLY INCLUDING A SNAP RING

CROSS-REFERENCE

This application claims priority to German patent application no. 10 2020 203 957.7 filed on Mar. 26, 2020, the contents of which are fully incorporated herein by reference.

TECHNOLOGICAL FIELD

The present disclosure is directed to a snap ring for retaining rolling elements in a bearing assembly which snap ring is configured to be engaged by a tool for easy removal from the bearing assembly and to a bearing assembly including the snap ring.

BACKGROUND

Bearing assemblies that have inner and outer rings with rolling elements therebetween can include snap rings to support and/or guide the rolling elements. Such snap rings can be snapped into one of the bearing rings, for example, using a groove in the bearing ring, and serve there as a flange for supporting the rolling elements, in particular rollers.

In order to remove such a snap ring from the bearing assembly, it has heretofore been necessary to provide a gap in the snap ring and use special pliers in order to capture the ring, widen or press the ring together at the gap, and pull the snap ring out from the bearing assembly. For this purpose some snap rings include additional material in the vicinity of the gap such as holes into which the tips of a pair of pliers can be introduced. At this point the pliers can press the ring together (by compressing the gap) or pull the ring apart (by spreading the ring at the gap). However, up to now special tools have been required for this purpose. Furthermore, in previous solutions the two ends of the snap ring must be moved toward each other by engaging the ring on both sides of the gap. However, this leads to a self-locking of the snap ring.

SUMMARY

It is therefore an aspect of the present disclosure to provide a snap ring that can be removed from a bearing assembly in a simple manner using standard tools.

The snap ring supports rolling elements in a bearing assembly, in particular a small bearing assembly that includes an inner ring and an outer ring. The bearing is preferably a roller bearing having rollers disposed between the inner ring and the outer ring. The snap ring is annular and can be snapped into the inner ring or the outer ring, preferably the outer ring. The snap ring thereby serves as a supporting (guiding) flange for the rolling elements.

In order to make the snap ring easily removable from the bearing assembly, the axial end side of the snap ring includes a recess that is configured such that a tool is insertable into the recess from outside the bearing assembly in order to remove the snap ring from the bearing assembly. Here the tool, which can be a standard tool, for example, a screwdriver, can be introduced into the recess in order to lever the snap ring out of the bearing assembly on one side. For this purpose the snap ring is either pressed together (in an arrangement on the outer ring) or pulled apart (in an arrangement on the inner ring) and then first lifted out on one side out of the bearing ring in the radial direction and subsequently pulled out from the entire bearing assembly in the axial direction.

The recess makes it possible to remove the snap ring from the bearing assembly using standard tools. Since only one recess is required, a simple manufacturing of the snap ring can furthermore be realized. In addition, in this way it is possible to lift the snap ring at one end. A self-locking, which can occur in previous snap rings, is thus avoided.

According to one embodiment, in the axial direction the recess is configured as a non-continuous recess or as a continuous opening. The recess is preferably configured as a non-continuous recess that is adequate to allow a tool to engages into the recess. Due to the non-continuous recess the stability of the snap ring can be ensured.

The snap ring can in particular be comprised of metal, for example, steel. This also increases the stability of the snap ring.

The extension of the recess in the radial direction can in particular fall in a range of 50 to 70% of the surface of the snap ring in the radial direction. Due to this radial extension of the recess it can be ensured that sufficient material remains on the snap ring in order not to jeopardize the stability of the snap ring. In particular, the extension can be dimensioned such that a standard tool can engage into the recess.

The snap ring in particular can be an open ring. The opening makes it possible to lift the snap ring at one end so that it can be lifted out from the corresponding bearing ring and removed from the bearing assembly without problems. In addition, the snap ring can be widened (during a removal from the inner ring) or pressed together (during the removal from the outer ring).

According to one preferred embodiment, the recess is disposed near the opening. In this way the tool can engage as a lever tool near the opening, and lift a side of the snap ring in order to remove the snap ring from the bearing assembly. In contrast to previous snap rings, a self-locking is thus avoided.

According to one embodiment, the snap ring includes a radially extending flange that is configured to engage into a corresponding groove in the raceway of the inner ring or of the outer ring of the bearing assembly. A part of the snap ring is thus disposed inside the inner ring or the outer ring, wherein the portion of the snap ring lying outside the bearing ring can serve as a flange for the rolling elements.

According to a further aspect, the bearing assembly includes an inner ring, an outer ring, and rolling elements disposed between the inner ring and the outer ring. The bearing assembly can in particular be a roller bearing. The bearing assembly includes a snap ring as described above, wherein the snap ring is in engagement with the inner ring or the outer ring.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail based on exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
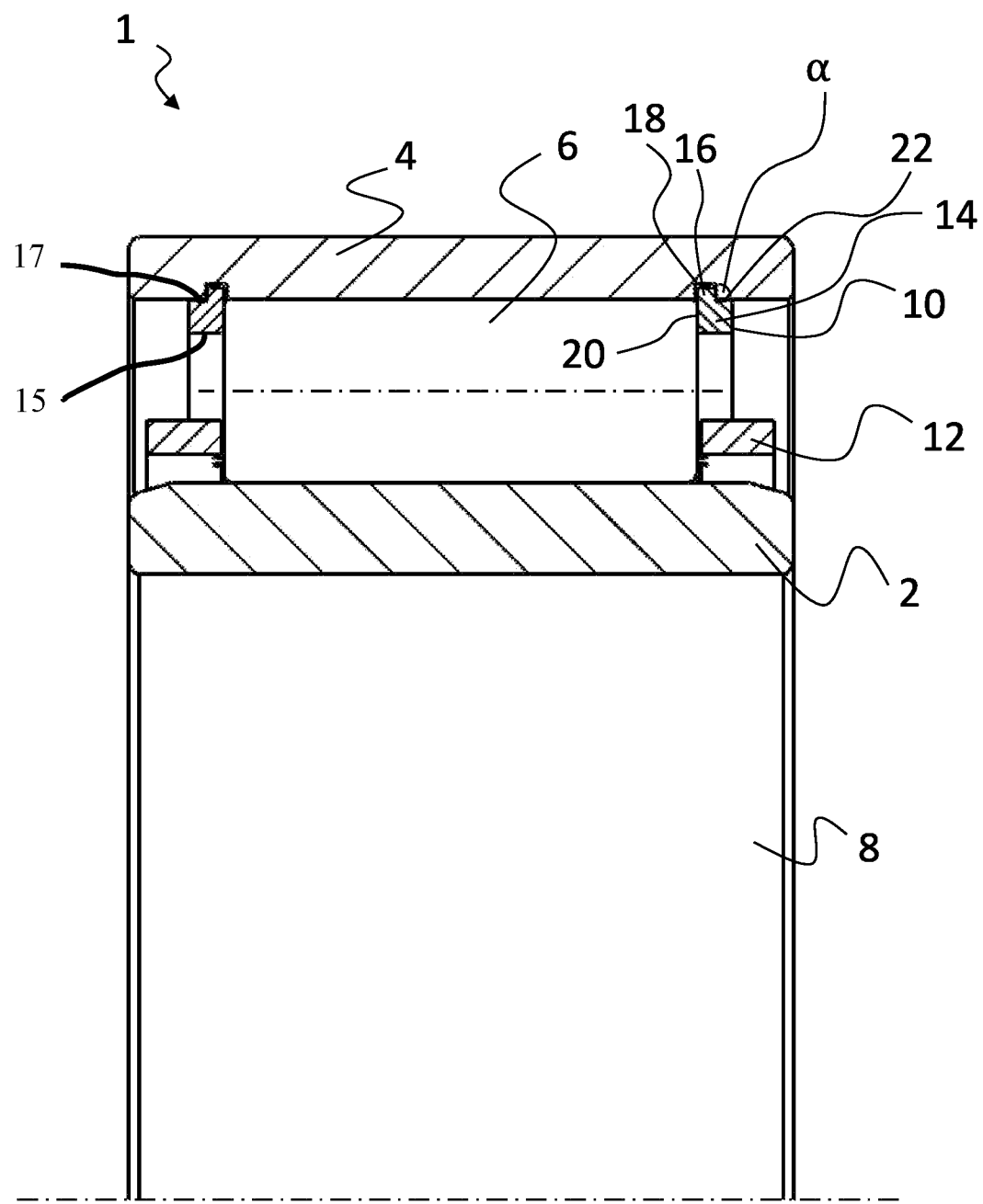
FIG. 1 is a cross-section through a bearing assembly including a snap ring according to an embodiment of the present disclosure.
Figure 2:
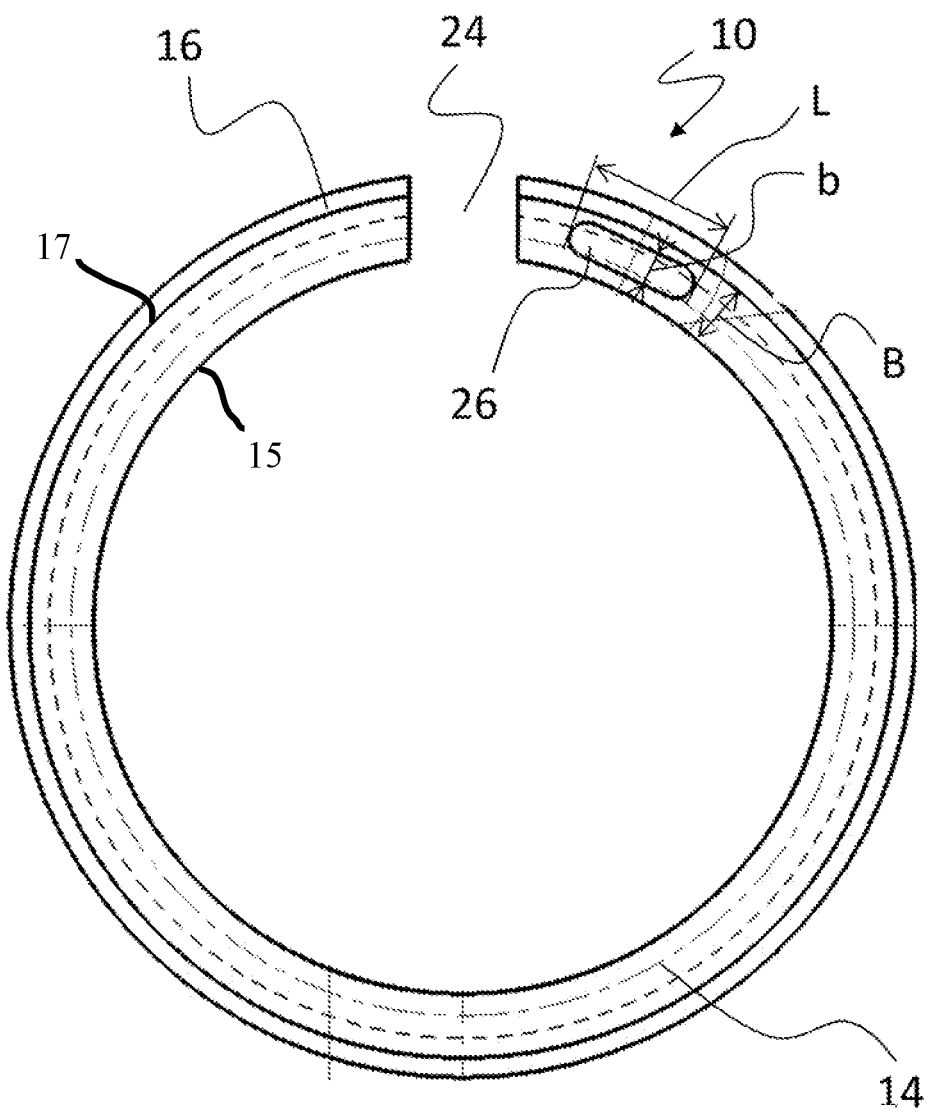
FIG. 2 is a plan view of the snap ring of FIG. 1.

FIG. 1 shows a bearing assembly 1, in particular a roller bearing, which includes an inner ring 2 and an outer ring 4. Rolling elements 6 are disposed between the inner ring 2 and the outer ring 4. The bearing assembly 1 can be disposed, for example, on a shaft (not shown) that extends through a central opening 8 in the inner ring 2. A flange 10 can be provided for supporting the rolling elements 6 that in the embodiment shown is in engagement with the outer ring 4. Alternatively the flange 10 could also be provided on the inner ring 2. Furthermore, a cage 12 can be provided to hold the rolling elements 6.

The flange 10 is formed by a snap ring 10. The snap ring 10 is formed by an open ring 14. The open ring 14 has a circular inner opening 15 (sometimes referred to as an "inner edge") and a circular outer edge 17. The inner opening 14 may be described as being "continuously concave" because it includes no convex portions; the outer edge 17 may be described as being "continuously convex" because it includes no concave portions. Furthermore, the snap ring 10 includes a radially extending flange 16. The flange 16 can engage into a corresponding groove 18 of the outer ring 4. This flange 16 fixes the snap ring 10 in the outer ring 4. An angle α between the flange 16 and the remainder of the open ring 14 in particular can be 90° or smaller.

An axial end side 20 of the snap ring 10 forms an abutment surface for the rolling elements 6. Due to the surface 22 of the open ring 14 the snap ring 10 can abut against the outer ring 4.

In order to be able to remove the snap ring 10 from the bearing assembly 1 in a simple manner, the snap ring 10 is provided as an open ring including a radial opening (gap) 24. The gap is preferably less than about 20 degrees; that is, the snap ring 10 is circular and the gap represents about a 20 degree arc removed from the circle. Due to this opening 24 the snap ring 10 can be compressed to reduce the size of the gap and thus reduce the outer diameter of the snap ring so that it can be removed from a slot in an outer ring or the gap can be enlarged to increase the inner diameter of the snap ring so that it can be removed from a slot in an inner ring of a bearing assembly.

Furthermore, the axial end side of the snap ring 10 near the gap 24 includes a recess 26 into which a standard tool can be engaged in order to lift the snap ring 10 from the bearing assembly 1. Using the standard tool, for example, a screwdriver, in particular, a flat-head screwdriver, the snap ring 10 can be lifted at the position of the recess 26. In contrast to previous snap rings, which can only be pressed together, the removal from the bearing assembly 1 is thus simplified, since a self-locking of the snap ring 10 is prevented. The radial width b of the recess 26 can in particular correspond to 50 to 70% of the radial width B of the side surface 22 of the snap ring 10.

The circumferential extension L of the recess 26 can be configured arbitrarily, and in any case should have a sufficient size such that a standard tool, such as, for example, a screwdriver, can engage into the recess 26. Preferably, the circumferential length of the recess is greater than the radial width of the recess. The recess 26 can be configured as a non-continuous recess or as a continuous opening.

As a non-limiting example of a method of removing the snap rig 10 from a bearing outer ring 4 as shown, a tool such as a flathead screwdriver can be inserted into the recess 26. If the width of the head of the screwdriver is greater than the radial width of the recess, twisting the screwdriver about its axis will wedge the head of the screwdriver in the recess 26. This wedging action will provide a sufficient engagement between the screwdriver and the snap ring to allow the end of the snap ring 10 near the recess 26 to be pushed radially inwardly (or outwardly in the case of a snap ring on a bearing inner ring) and pulled axially away from the groove 18. With the end of the snap ring 10 removed from the groove 18 in this manner, a tool can be moved along the rest of the circumference of the snap ring 10 between the snap ring and the bearing ring 4, to pull the remainder of the snap ring 10 out of the groove 18. Modifications to this method are possible based on the configuration of the tool.

The recess 26 makes it possible in a simple manner to introduce a standard tool into the recess 26. This standard tool can then lift the snap ring by a lever effect and lift the snap ring out of the bearing assembly 1.

Due to the snap ring described herein it is possible to apply a snap ring in a bearing assembly in a simple manner and be able to remove it from the bearing assembly again without special tools. Furthermore, the manufacturing of the snap ring is simplified, since a corresponding recess need only be provided in a conventional snap ring.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved snap rings for bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Inner ring
4 Outer ring

6 Rolling element
8 Opening
10 Snap ring
12 Cage
14 Open ring
16 Flange
18 Groove
20 Abutment surface
22 Abutment surface
α Angle
24 Opening
26 Recess
b Radial width of the recess
B Radial width of the snap ring
L Circumferential extension of the recess

We claim:

1. A snap ring for guiding rolling elements between an inner ring and an outer ring of a bearing assembly, the snap ring comprising:
    an annular body having an axially facing side surface a circular inner opening, a circular outer edge and a radially extending flange extending from the circular outer edge, the body having a circumferential gap between a first end of the body and a second end of the body and a recess in the side surface adjacent to the gap, the entire recess being located radially between the circular inner opening and the circular outer edge,
    wherein the recess is configured such that a tool is introducible into the recess from outside the bearing assembly in order to remove the snap ring from the bearing assembly, and
    wherein the recess has a recess bottom facing in the axial direction.

2. The snap ring according to claim 1, wherein the annular body and the flange are comprised of steel.

3. The snap ring according to claim 1,
    wherein a radial width of the recess is 50 to 70% of a radial width of the annular body.

4. The snap ring according to claim 1,
    wherein the annular body has a substantially constant radially thickness.

5. The snap ring according to claim 1,
    wherein the circular inner opening and the circular outer edge are coaxial.

6. The snap ring according to claim 1,
    wherein the gap comprises an arc of about 20 degrees or less.

7. The snap ring according to claim 6,
    wherein the annular body includes a first arc portion on a first side of the gap and a second arc portion on a second side of the gap, the second portion having a same angular extent as the first arc portion,
    wherein the recess is located in the first arc portion, and
    wherein the second arc portion is recess free.

8. The snap ring according to claim 7,
    wherein the angular extent is less than or equal to 45 degrees.

9. A bearing assembly comprising:
    an inner ring,
    an outer ring, and rolling elements disposed between the inner ring and the outer ring, and
    a snap ring according to claim 8 in engagement with the inner ring or the outer ring.

10. A bearing assembly comprising:
    an inner ring,
    an outer ring, and rolling elements disposed between the inner ring and the outer ring, and
    a snap ring according to claim 1 in engagement with the inner ring or the outer ring.

11. A snap ring for guiding rolling elements between an inner ring and an outer ring of a bearing assembly, the snap ring comprising:
    an annular body having an axially facing side surface and radially extending flange, the body being circular and having a circumferential gap between a first end of the body and a second end of the body and a recess in the side surface adjacent to the gap,
    wherein the recess is configured such that a tool is introducible into the recess from outside the bearing assembly in order to remove the snap ring from the bearing assembly, and
    wherein, except for the recess, the axially facing side surface is recess free.

12. A snap ring for guiding rolling elements between an inner ring and an outer ring of a bearing assembly, the snap ring comprising:
    an annular body having an axially facing side surface, a continuously concave inner edge, a continuously convex outer edge a radially extending flange extending from the continuously convex outer edge and a circumferential gap between a first end of the body and a second end of the body and a recess in the side surface adjacent to the gap, the concave inner edge and the convex outer edge extending from the first end of the body to the second end of the body; and
    the recess being configured such that a tool is introducible into the recess from outside the bearing assembly in order to remove the snap ring from the bearing assembly,
    wherein the entire recess is located radially between the concave inner edge and the convex outer edge.

13. The snap ring according to claim 12,
    wherein the recess does not extend axially through the body.

14. The snap ring according to claim 12,
    wherein the recess extends axially through the body.

15. The snap ring according to claim 12,
    wherein the concave inner edge lies on a first circle.

16. The snap ring according to claim 15,
    wherein the convex outer edge lies on a second circle coaxial with the first circle.

17. The snap ring according to claim 16,
    wherein the annular body has a substantially constant radial thickness.

18. A bearing assembly comprising:
    an inner ring,
    an outer ring, and rolling elements disposed between the inner ring and the outer ring, and
    a snap ring according to claim 12 in engagement with the inner ring or the outer ring.

* * * * *